(12) United States Patent
Witten

(10) Patent No.: US 11,263,907 B2
(45) Date of Patent: Mar. 1, 2022

(54) SYSTEM INCLUDING A USER INTERFACE APPLICATION FOR RESERVING A PARKING SPACE

(71) Applicant: Tyler Witten, Argyle, TX (US)

(72) Inventor: Tyler Witten, Argyle, TX (US)

(*) Notice: Subject to any disclaimer, the term of this patent is extended or adjusted under 35 U.S.C. 154(b) by 0 days.

(21) Appl. No.: 16/593,991

(22) Filed: Oct. 5, 2019

(65) Prior Publication Data
US 2020/0111361 A1  Apr. 9, 2020

Related U.S. Application Data

(60) Provisional application No. 62/742,097, filed on Oct. 5, 2018.

(51) Int. Cl.
| | |
|---|---|
| *G08G 1/14* | (2006.01) |
| *H04W 4/80* | (2018.01) |
| *G01C 21/36* | (2006.01) |
| *G06K 9/32* | (2006.01) |

(52) U.S. Cl.
CPC ......... *G08G 1/149* (2013.01); *G01C 21/3685* (2013.01); *G06K 9/325* (2013.01); *G08G 1/146* (2013.01); *G08G 1/148* (2013.01); *H04W 4/80* (2018.02)

(58) Field of Classification Search
CPC .... G01C 21/3685; G06K 9/325; G08G 1/146; G08G 1/148; G08G 1/149; H04W 4/02; H04W 4/44; H04W 4/80
See application file for complete search history.

(56) References Cited

U.S. PATENT DOCUMENTS

| | | | | |
|---|---|---|---|---|
| 6,150,958 A | * | 11/2000 | Worsham | E01F 13/085 340/932.2 |
| 7,011,470 B1 | * | 3/2006 | Breazeale | E01F 9/529 404/10 |
| 2002/0043025 A1 | * | 4/2002 | Zayas | E01F 9/681 49/33 |
| 2014/0214499 A1 | * | 7/2014 | Hudson | G07F 17/246 705/13 |
| 2014/0335897 A1 | * | 11/2014 | Clem | G08G 1/147 455/456.3 |
| 2015/0138001 A1 | * | 5/2015 | Davies | G08G 1/0175 340/932.2 |
| 2017/0032584 A1 | * | 2/2017 | Moran | H04W 4/02 |
| 2020/0302790 A1 | * | 9/2020 | Humphreys | G08G 1/144 |

* cited by examiner

*Primary Examiner* — Omer S Khan
(74) *Attorney, Agent, or Firm* — Kenneth L Tolar

(57) ABSTRACT

The present invention discloses a system and method to reserve and park a vehicle in a parking lot via an application through a smartphone. The system comprises a parking meter installed at the parking lot to prevent unauthorized access of vehicle to the reserved parking lot. The parking meter could communicate to a server via a wireless communication for reserving a parking lot. The application could identify the user's location and allows the user to communicate or engage the parking meter at the parking lot via the navigation system. The parking meter comprises a housing, a camera, a chip reader, displays, a plurality of backlight panels, NFC, and ultrasonic sensor. The parking meter authorizes the vehicle's number and provides access to the parking lot. The user could pay for the usage of the parking lot via the application or the chip reader or NFC of the parking meter.

16 Claims, 11 Drawing Sheets

SYSTEM INCLUDING A USER INTERFACE APPLICATION FOR RESERVING A PARKING SPACE

BACKGROUND OF THE INVENTION

A. Technical Field

The present invention generally relates to a system and method for parking a vehicle in a parking lot. More specifically, the present invention relates to a system and method to reserve and park a vehicle in a parking lot or deck via an application through a user interface.

B. Description of Related Art

Automobiles are probably one of the most useful of all modern conveniences that are in mass use in today's society. Along with the automobile comes all of the responsibilities and issues that accompany the ownership and use of the vehicle. Regular maintenance is required to keep the vehicle in condition plus the taxes and compliance with local traffic laws. Traffic is probably the worst and most difficult of problems associated with the automobiles. The world's population continues to grow and expand and owners and operators of automobiles keeps increasing likewise. The local communities, as well as the federal government, attempt to keep up with the ever-increasing traffic with the construction of new and expanded roadways, but they are only responding to the existing situation and solutions will never keep up with demand. The traffic situation is one of the most frustrating circumstances to the person driving the vehicle. The power and ability of the current generation of vehicles are rendered useless in traffic, and it becomes a slow progression of people seeking their various destinations.

In addition to the burden of traffic and frustration with the automobile transportation, finding a place to park the vehicle is more difficult. Most people have designated spots to park their vehicle. There are instances where people do not have personal spots to park especially at certain residences such as apartments in dense city areas. However, most issues with parking occurs in town when shopping or visiting, or attending an event. Parking issues could make people late for some events. Search for a parking place could often take much more time than anticipated. The situation is especially exacerbated when parking is very limited, or the parking areas are very remote. Parking garages are helpful, but a parking garages could get full, and a search through a garage could become time consuming and frustrating. Clearly better solutions are needed to alleviate difficult parking situations and reduce the time consumed for searching the parking place.

The ever-increasing use of automobiles and limited space for parking, particularly in urban areas, has led to serious problems in parking management. It is often expensive and logistically cumbersome for police or municipality officials to keep track of offenders who park their vehicles without paying for the parking space. Parking meters do not fully solve the problem because they require a large investment on the part of the municipality and comprehensive monitoring by enforcement personnel.

Therefore, there is a need for a system and method for parking vehicles in the parking lot without wasting time, congestion, and frustration. There is also a need to provide a system for the users to reserve a parking lot through an application installed in a user's handheld device or user interface. There is also a need to provide a system with a new parking meter and application for providing multiple payment modes to the users. There is also a need to provide a system with the parking meter to prevent and secure from the unauthorized access of vehicles in the parking lot.

SUMMARY OF THE INVENTION

The present invention generally discloses a system for parking a vehicle in a parking slot. Further, the present invention discloses a system and method to reserve and park a vehicle in a reserved parking lot or deck via an application through a user interface.

According to the present invention, the user could park a vehicle in the parking lot via the parking meter through an application. In one embodiment of the present invention, the parking meter could be installed at the parking lot via drilled and secured with anchor bolts and nuts for supporting ground or sidewalks near curbing and street pavements. In one embodiment, the parking meter could be positioned in front of the parking lot or vehicle's parking space. In one embodiment, the parking meter is configured to interact with the application for reserving an empty parking lot or deck for the user's vehicle. In one embodiment, the parking meter could be communicated to a server via wireless communication. In another embodiment, the parking meter could be communicated to the server via a wired communication. In one embodiment, the wireless communication could be, but not limited to, Wi-Fi, WLAN, a global positioning system (GPS) and Bluetooth. In one embodiment, the parking lot or deck includes concrete blocks. The concrete blocks are configured to protect the parking meter from damages.

In one embodiment, the user could reserve the parking lot or deck for the vehicle via a user interface through the application. In one embodiment, the user could pay the money for the parking lot via the user interface. In one embodiment, the application could identify the address and location of the user and allow the user to communicate or engage the parking meter at each of the correctly equipped empty parking lots. The user also could get the directions to the parking lot and pay from their smartphone or other electronic devices via the application. In one embodiment, the user interface could be, but not limited to, a smartphone or mobile, a tablet, PDA, a laptop or a computer.

In another embodiment of the present invention, the parking meter could be installed at a corner of a parking lot via drilled, and secured with, but not limited to, anchor bolts and nuts for supporting ground at parking lot, or sidewalks near curbing and street pavements. In one embodiment, the parking lot is provided with a barrier assembly. In one embodiment, the barrier assembly could be communicated to the parking meter via, a wireless communication or wired communication. In one embodiment, the barrier assembly is configured to block unauthorized access of the vehicles to the parking lot. In one embodiment, the barrier assembly comprises a stopper or a stop signboard and a speed bump. In one embodiment, the speed bump comprises a provision or slot for the stopper or stop signboard. In one embodiment, the speed bump could be drilled or fastened to the ground and secured via, but not limited to, anchor bolts and nuts for supporting the ground at the entrance of the parking lot.

In one embodiment, the parking meter comprises a housing. The housing could be supported on a support pole. In one embodiment, the housing further comprises multiple electronic components such as a camera, a chip reader, displays, a plurality of backlight panels or indicators and a plurality of switches. In one embodiment, the housing could be an injection molded part. In one embodiment, the housing is made of a material, but not limited to, a fiberglass reinforced polypropylene (FRP) plastic. The housing is highly resistant to impacts, chemicals, ultraviolet degradation, and water. In one embodiment, the housing could be removably attached to a supporter. In one embodiment, the housing is held together via, but not limited to, a casket seal with an O-ring and tamper proof fasteners. In one embodiment, the supporter could be a galvanize coated steel pipe.

In one embodiment, the camera is configured to capture the image of the vehicle's license plate. In one embodiment, the camera could be 0.5" CCD camera utilizes a 170° wide angle lens, so it could easily capture images within the parking lot. In one embodiment, the camera has 5 megapixels. In one embodiment, the housing comprises a plurality of LEDs and positioned at near to the camera.

In one embodiment, the chip reader is configured to scan or read a debit or a credit card with the RIFD chip embedded on it. The chip reader is configured to read and accept any debit or credit card with the RIFD chip embedded in it. The user could pay the amount for the use of the parking lot by using the debit or credit card via the chip reader, the display and, the switches.

In one embodiment, the parking meter comprises at least two displays. One display is positioned on the upper portion of the housing and configured to display the vehicle's number with large letters and the other display is configured to communicate with the user via the plurality of switches to perform multiple operations. In one embodiment, the displays could be liquid crystal displays. The displays are configured to display almost any text or image, large or small, with extreme clarity. In one embodiment, the displays are easily controlled with the controlling computer or controller.

In one embodiment, the plurality of backlight panels or indicators is configured to indicate a status of the parking lot. In one embodiment, each backlight panel or indicator could be illuminated in a different color and inscribed with the appropriate word. In one embodiment, the backlight panels could be illuminated in multiple colors, but not limited to, red, green and yellow colors. In one embodiment, the red backlight panel could be inscribed with the word "reserved", the green backlight panel could be inscribed with the word "available" and the yellow backlight panel could be inscribed with the word "violation".

In one embodiment, the parking meter further comprises a controlling computer or a controller. The controlling computer or controller is configured to control the electronic components of the housings of the parking meter. The controlling computer has Wi-Fi capability in the range of 802.11 a/b/g/n/ac dual band and Ethernet 10/100T. In one embodiment, the plurality of switches is positioned on both sides of the display. In one embodiment, the plurality of switches could be sealed and printed with the operating functions. In one embodiment, the user could operate the plurality of switches for different functions via the display.

In one embodiment, the parking meter further comprises a near field communication (NFC). In one embodiment, the NFC could allow the user to communicate with the parking meter to pay for the usage of the parking lot via the smartphone or tablet. In one embodiment, the parking meter further comprises an ultrasonic sensor. In one embodiment, the ultrasonic sensor is configured to sense the movement of the vehicle near to the parking lot. Based on the output of the ultrasonic sensor, the controller or controlling computer could initiate the operation of the camera to capture the vehicle's license number for authorization.

In another embodiment, the parking meter could be augmented with a pop-up arm that is located in a slot at the rear of the parking lot. In other embodiment, the parking meter could utilize a post with a motorized arm at the end of the parking lot that swings down when the user arrived at the parking lot. In one embodiment, the parking meter comprises an onboard battery. In one embodiment, a power line could provide power to the parking meter and could charge the onboard battery of the parking meter.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1A:
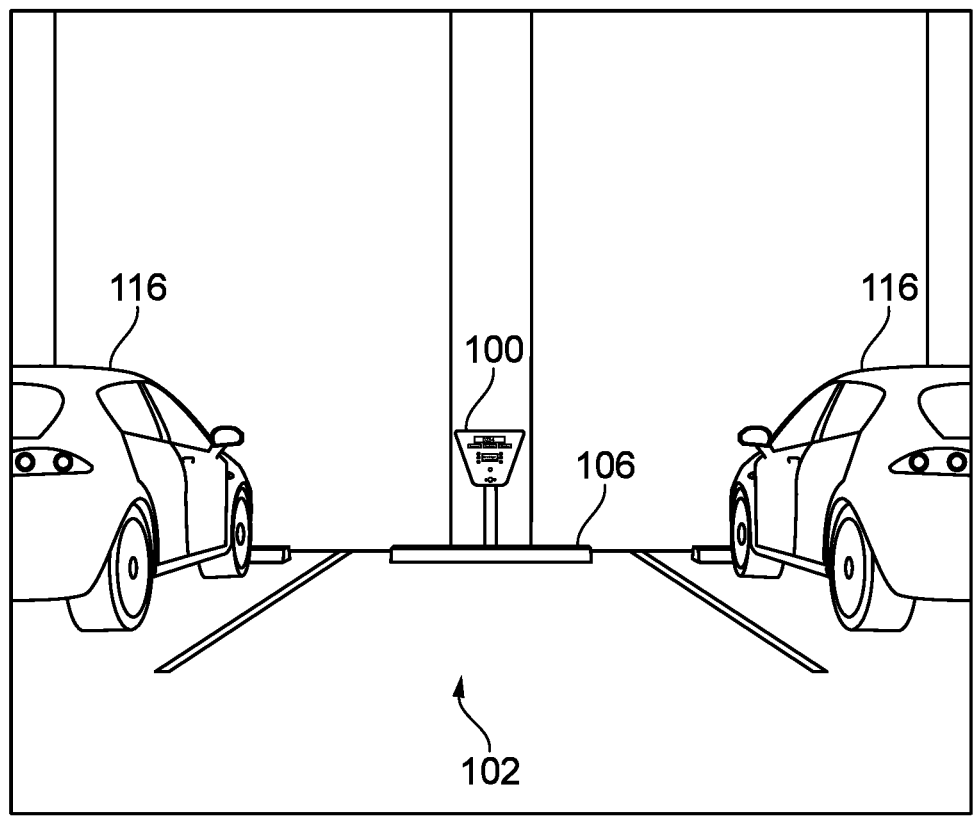
FIG. 1A shows a perspective view of a parking meter installed in front of a parking lot in an embodiment of the present invention.

Referring to FIG. 1A, the perspective view of a parking meter 100 installed in a parking lot 102 is illustrated. In one embodiment, the present invention describes a system and method for parking a vehicle 116 in the parking lot 102 via the parking meter 100 through an application. In one embodiment, the parking meter 100 could be installed in the parking lot 102 via drilled, and secured with anchor bolts and nuts for supporting ground or sidewalks near curbing and street pavements. In one embodiment, the parking meter 100 could be positioned in front of the parking lot 102 or vehicle 116. In one embodiment, the parking meter 100 is configured to interact with the application for reserving an empty parking lot or deck 102 for the user's vehicle 116. In one embodiment, the parking meter 100 could be communicated to a server via wireless communication. In another embodiment, the parking meter 100 could be communicated to the server via a wired communication. In one embodiment, the parking lot or deck 102 could be stripped or marked to identify the available space for parking the vehicle 116. In one embodiment, the parking lot or deck 102 includes concrete blocks 106. The concrete blocks 106 are configured to protect the parking meter 100 from damages.

Figure 1B:
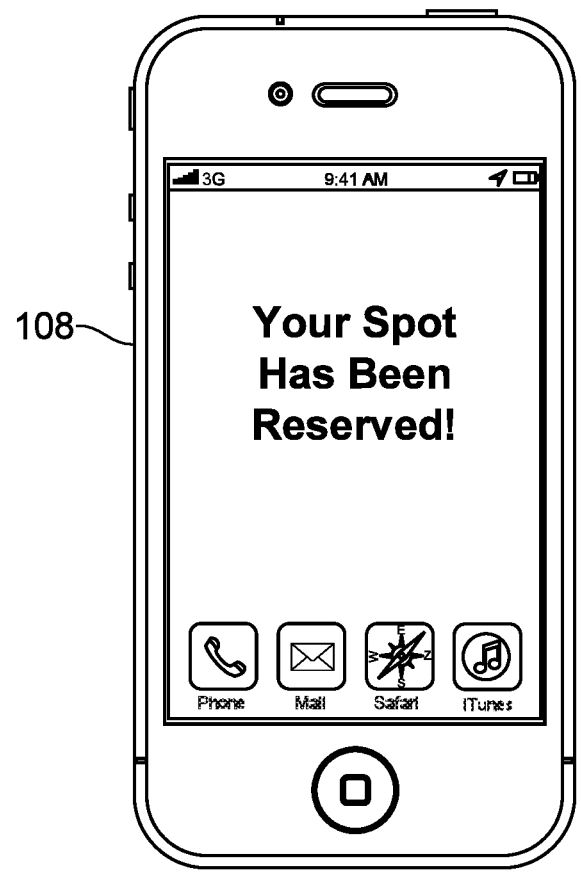
FIG. 1B shows a front view of an example user interface of a smartphone for notifying reservation alert to a user via an application in one embodiment of the present invention.

Referring to FIG. 1B, the front of an example user interface of a smartphone 108 for notifying parking lot 102 reservation alert to the user via the application is illustrated. In one embodiment, the user could reserve the parking lot or deck 102 for the vehicle 116 via the user interface i.e., smartphone 108 through the application. In one embodiment, the user could pay the money for the parking lot 102 via the smartphone 108. In one embodiment, the application could identify the address and location of the user, and allows the user to communicate or engage the parking meter 100 at each of the correctly equipped empty parking lots. The user also could get the directions to the parking lot 102, and pay from their smartphone or other electronic devices via the application. In one embodiment, the user interface could be, but not limited to, a smartphone or mobile, a tablet, PDA, a laptop and a computer.

Figure 2:
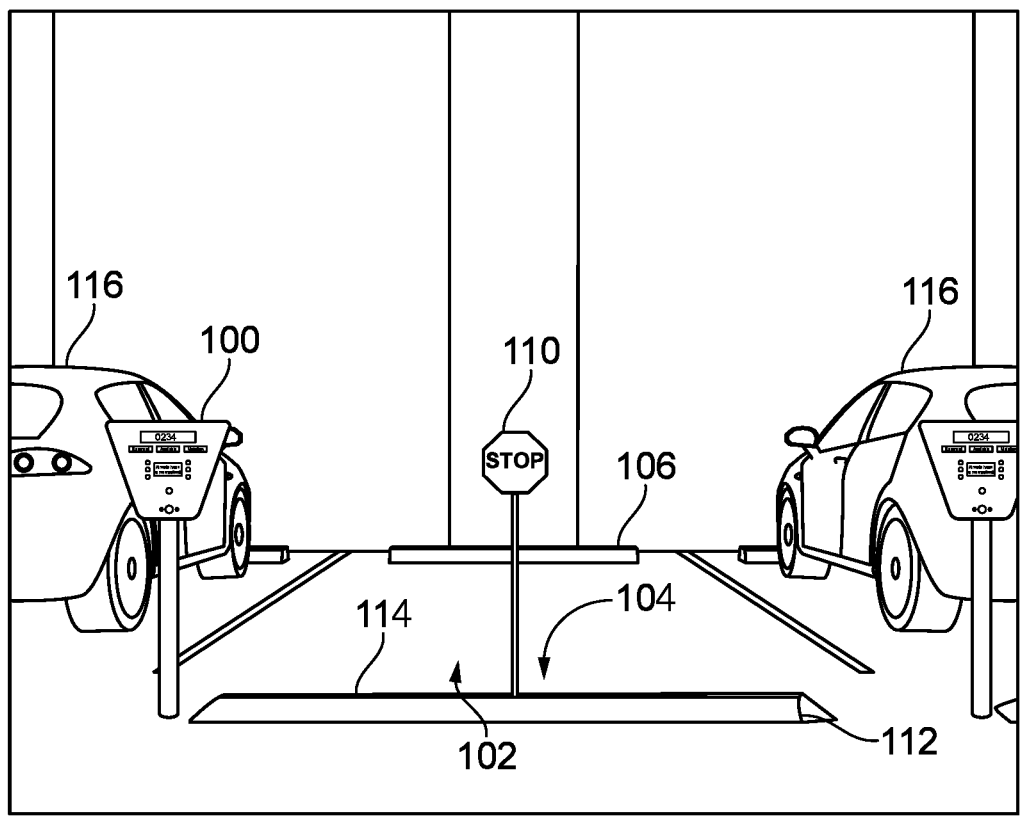
FIG. 2 shows a perspective view of a parking meter installed at an entry of a parking lot in another embodiment of the present invention.

Referring to FIG. 2, the perspective view of a parking meter 100 installed at a corner of a parking lot 102, provided with a barrier assembly 104 is illustrated. In another embodiment, the parking meter 100 could be installed at the corner of a parking lot 102 via drilled, and secured with, but not limited to, anchor bolts and nuts for supporting ground at parking lot 102, or sidewalks near curbing and street pavements. In one embodiment, the parking lot 102 is provided with a barrier assembly 104. In one embodiment, the barrier assembly 104 could be communicated to the parking meter 100 via, a wireless communication or wired communication. In one embodiment, the barrier assembly 104 is configured to block unauthorized access of the vehicles 116 to the parking lot 102. In one embodiment, the parking meter 100 could allow the user to pay for the parking lot 102 via the smartphone 108.

In one embodiment, the barrier assembly 104 comprises a stopper or a stop signboard 110 and a speed bump 112. In one embodiment, the speed bump 112 comprises a provision or slot 114 for the stopper 110. When the authorized vehicle arrives for its reservation, the stopper 110 folds into the provision or slot of the speed bump 112 and the vehicle 116 enters the parking lot 102 by driving over the speed bump 112. In one embodiment, the stopper 110 could be operated via, but not limited to, a motor or a lifting mechanism based on the signals from the parking meter 100. In one embodiment, the speed bump 112 could be drilled or fastened to the ground and secured via, but not limited to, anchor bolts and nuts for supporting the ground. In one embodiment, the speed bump 112 could be installed at the entrance of the parking lot 102.

Figure 3A:
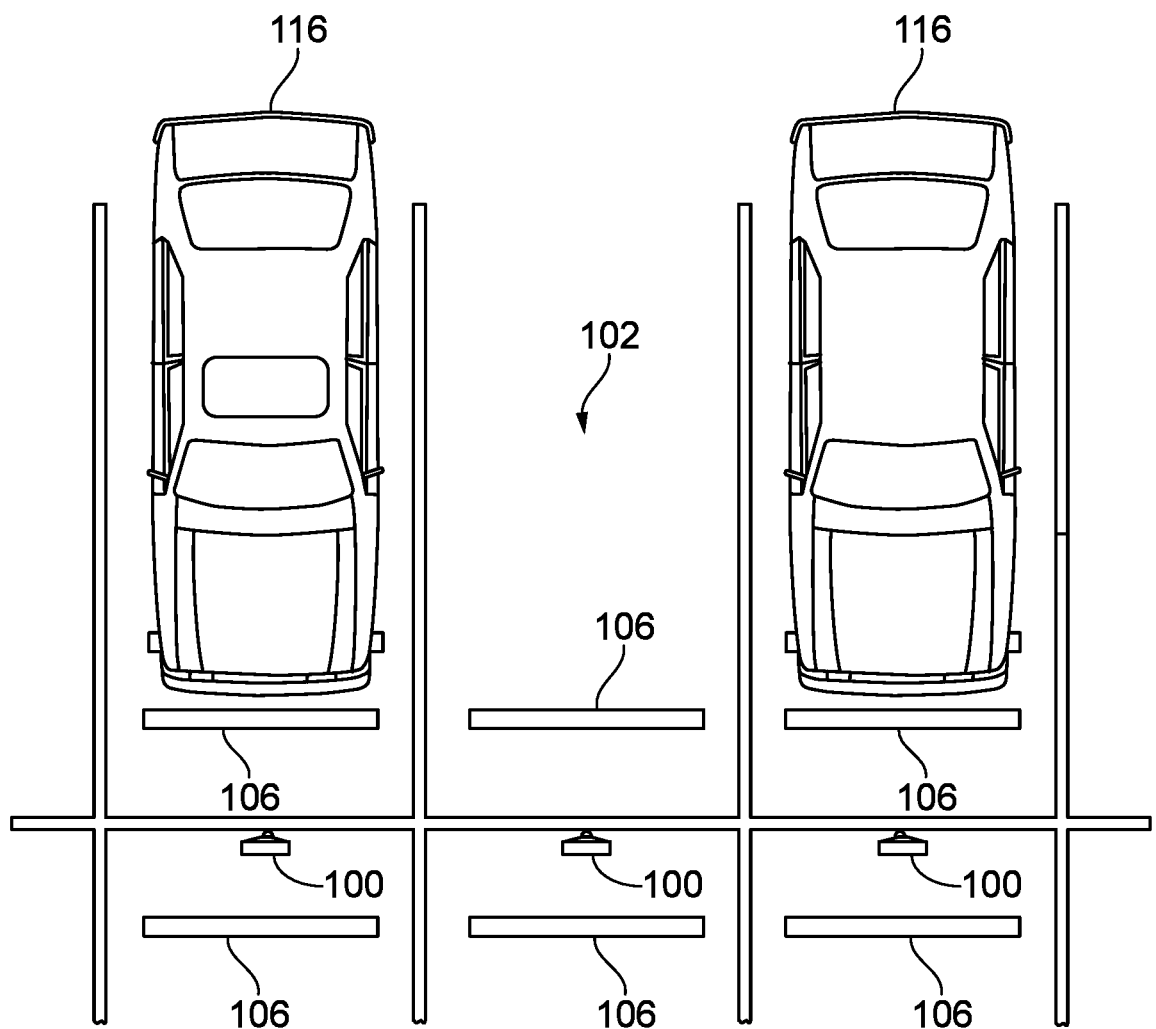
FIG. 3A shows a top view of the parking meter installed in front of the parking lot in one embodiment of the present invention.

Referring to FIG. 3A, the top view of the parking meter 100 installed in front of the parking lot 102 is illustrated. In one embodiment, each parking meter 100 could be installed at each parking lot 102. In one embodiment, the parking lot 102 is provided with the concrete blocks 106. The concrete blocks 106 configured to protect the parking meter 100 from damages. The concrete block 106 allows long operating life with little wear. In one embodiment, the user could reserve the parking lot 102 via, but not limited to, a smartphone or mobile, a tablet, PDA, a laptop and a computer. In one embodiment, the vehicle 116 is slotted into the reserved parking lot 102. After usage of the parking lot 102, the user has paid and left the parking lot 102, then all the backlight panels (124, 126 and 128) are extinguished. If the vehicle 116 is parked in a reserved parking lot 102, and the user has left without paying, a violation backlight panel 128 will be illuminated and the server will warn the operator, so the vehicle 116 could be towed.

Figure 3B:
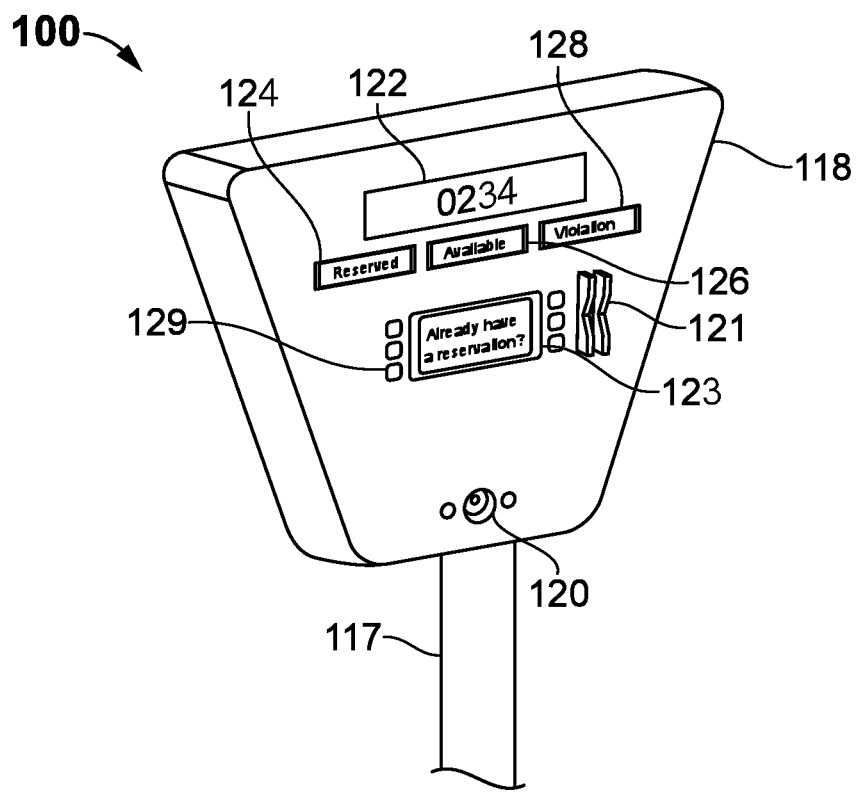
FIG. 3B shows a perspective view of the parking meter in an embodiment of the present invention.

Referring to FIG. 3B, the perspective view of the parking meter 100 is illustrated. In one embodiment, the parking meter 100 is configured to monitor opposite parked vehicles 116 in the opposite parking lots 102. In one embodiment, the parking meter 100 is configured to communicate to a server via a wireless communication. In one embodiment, the wireless communication could be, but not limited to, Wi-Fi, WLAN, a global positioning system (GPS) and Bluetooth. In one embodiment, the server could be communicated to the user's smartphone via wireless communication.

In one embodiment, the parking meter 100 comprises a housing 118. The housing 118 could be supported on a support pole 117. In one embodiment, the housing 118 further comprises multiple electronic components such as a camera 120, a chip reader 121, displays (122 and 123), a plurality of backlight panels or indicators 124, 126 and 128 and a plurality of switches 129. In one embodiment, the camera 120 is configured to capture the image of the vehicle's license plate. In one embodiment, the chip reader 121 is configured to scan or read a debit or a credit card with the RIFD chip embedded in it. In one embodiment, the display 122 is configured to display the vehicle's number with large letters and the other display 123 is configured to communicate with the user via the plurality of switches 129 to perform multiple operations.

In one embodiment, the plurality of backlight panels or indicators 124, 126 and 128 are configured to indicate a status of the parking lot 102. In one embodiment, the parking meter 100 further comprises a controlling computer or a controller. The controlling computer or controller is configured to control the electronic components of the housings 118 of the parking meter 100. In one embodiment, the controlling computer has specifications, but not limited to, Quad-core 2 GB instructions per second with 2 GB of RAM and 16 GB of flash storage. The controlling computer has Wi-Fi capability in the range of 802.11 a/b/g/n/ac dual band and Ethernet 10/100T. It also has Bluetooth in the range of 5.0, A2DP, LE. It is video, audio, image capable.

Figure 4A:
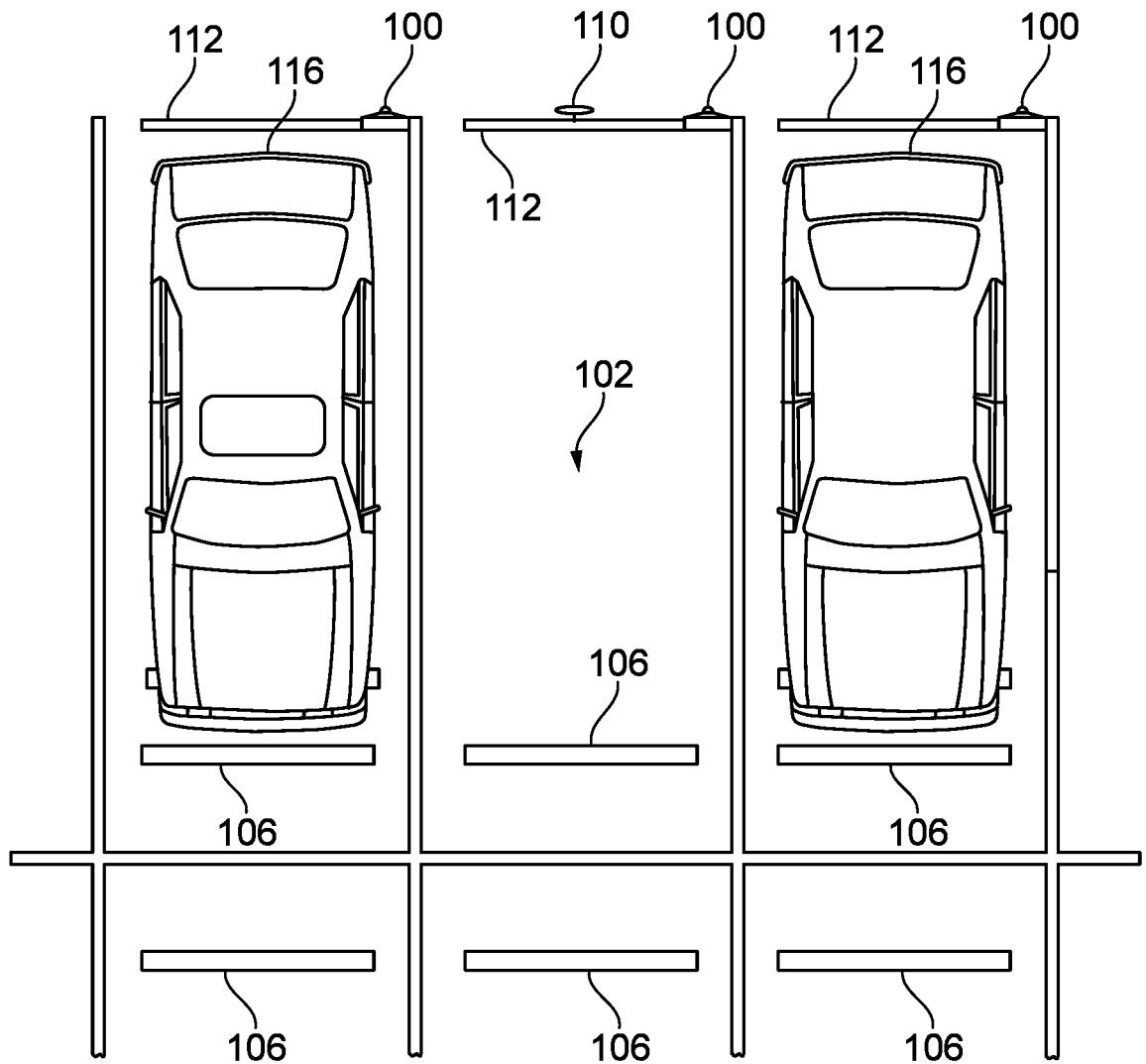
FIG. 4A shows a top view of the parking meters installed at a corner of parking lots in an embodiment of the present invention.

Referring to FIG. 4A, the top view of the parking meters 100 installed at a corner of the parking lots 102 is illustrated. In another embodiment, the multiple parking meters 100 could be installed at the corner of the parking lot 102 for providing access to the authorized vehicles 116. In one embodiment, each parking lot 102 installed with a barrier assembly 104 via drilled, and secured with anchor bolts and nuts for supporting the ground.

Figure 4B:
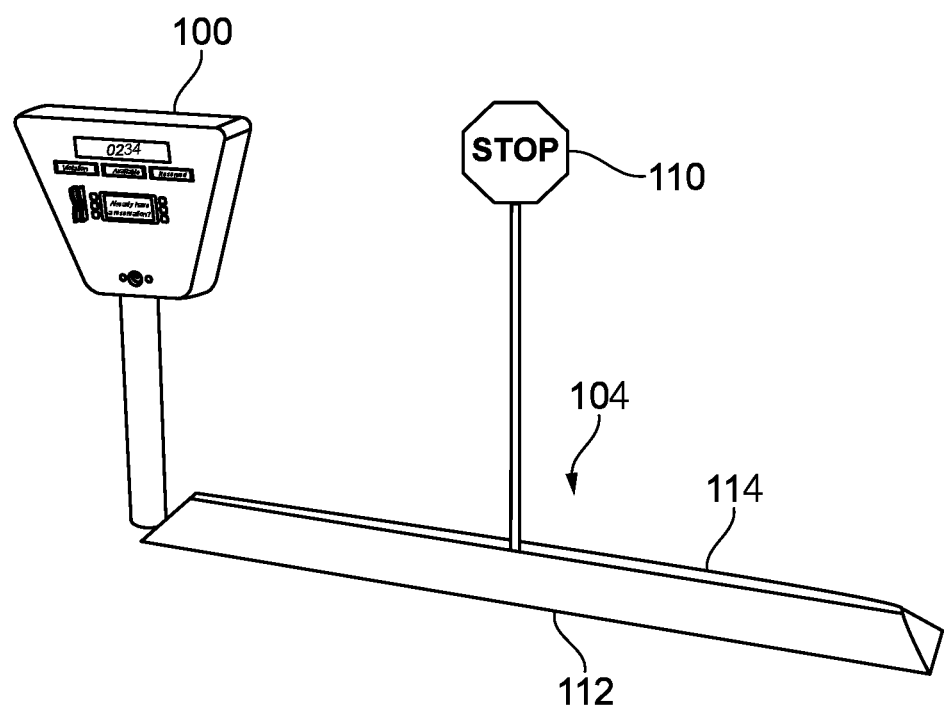
FIG. 4B shows a perspective view of a barrier assembly in an embodiment of the present invention.

Referring to FIG. 4B, the perspective view of the barrier assembly 104 is illustrated. In one embodiment, the barrier assembly 104 could prevent access for the unauthorized vehicles. In one embodiment, the parking meter 100 could communicate with the barrier assembly 104. If the authorized vehicle 116 could arrive for parking in the parking lot 102, the parking meter 100 could capture the vehicle's number via the camera 120 and sensors and could transfer the information to the controller or controlling computer. In one embodiment, the controller could communicate with the barrier assembly 104 to provide access for the authorized vehicle 116. If an unauthorized vehicle could arrive at the parking lot 102, the barrier assembly 104 could not provide the access for the unauthorized vehicle.

Figure 5:
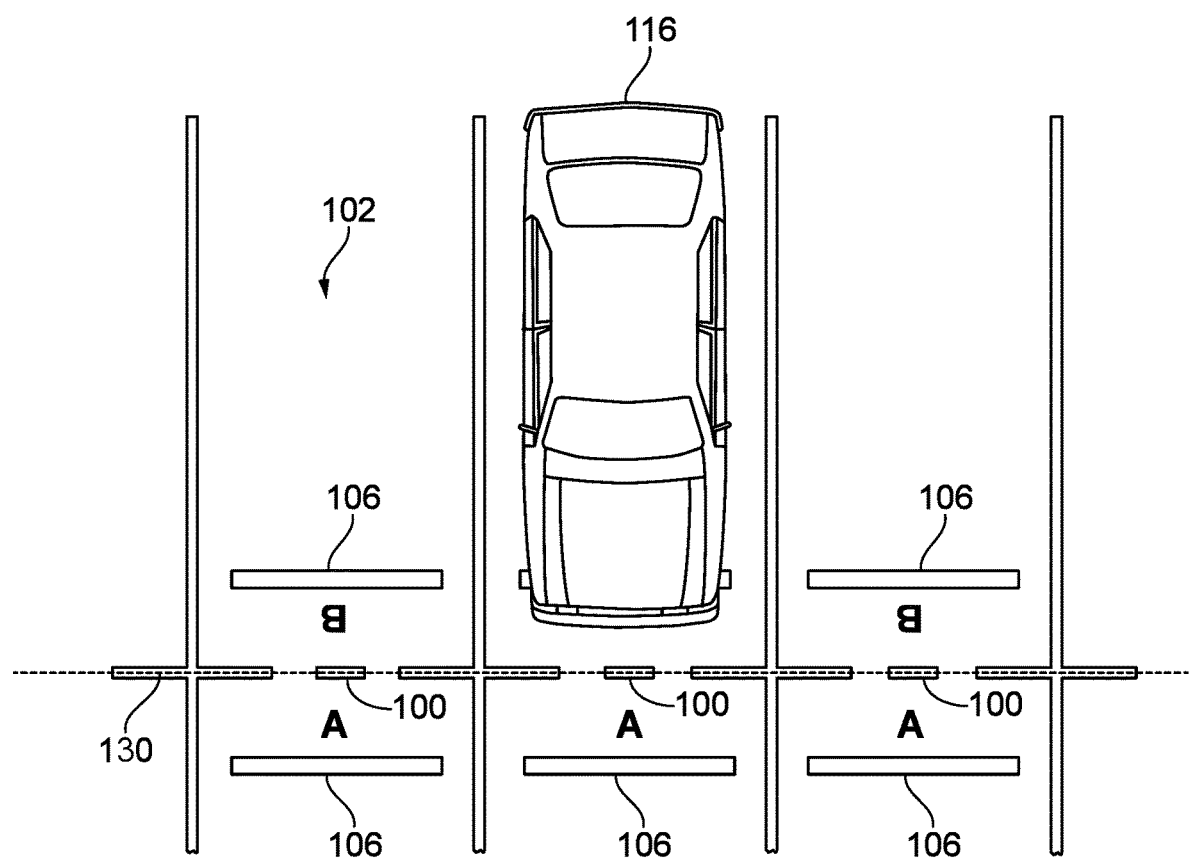
FIG. 5 shows a top view of the parking meter powered by a power supply in an embodiment of the present invention.

Referring to FIG. 5, the top view of the parking meter 100 powered by a power line 130 is illustrated. In one embodiment, the parking meter 100 is powered by the power line 130, which is fed from the support pole 117 of the parking meter 100. In one embodiment, the power line 130 could be supplied power to an onboard battery of the parking meter 100. The charged battery could allow the parking meter 100 to work for a few hours even if the power could be interrupted. In one embodiment, the onboard battery could be, but not limited to, lithium ion batteries, solar and fuel cell batteries. In one embodiment, the onboard battery could be a primary operating source and a charger is provided for capable of keeping the battery full even while operating.

Figure 6A:
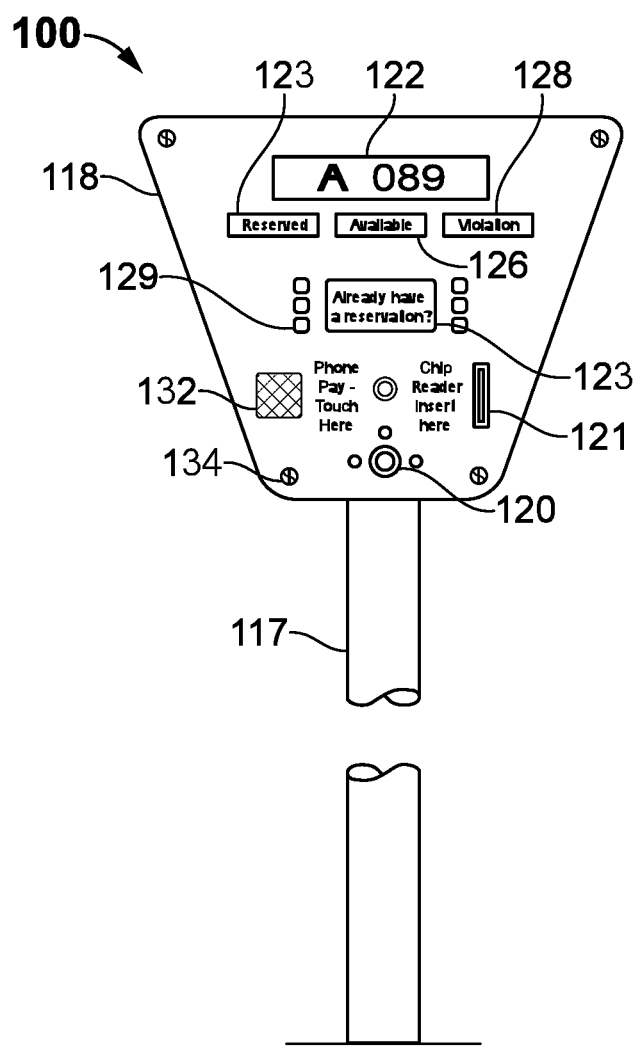
FIG. 6A shows a front view of the parking meter in an embodiment of the present invention.

Referring to FIG. 6A, the front view of the parking meter 100 is illustrated. In one embodiment, the housing 118 could be an injection molded part. In one embodiment, the housing 118 is made of a material, but not limited to, a fiberglass reinforced polypropylene (FRP) plastic. The housing 118 is highly resistant to impacts, chemicals, ultraviolet degradation, and water. The housing 118 could be interrogated from the repair facility or could be accessed in the field using a tablet, or if necessary could be removed by the technician and returned to the repair shop.

In one embodiment, the camera 120 could be 0.5" CCD camera utilizes a 170° wide angle lens, so it could easily capture images within the parking lot 102. In one embodiment, the camera 120 has 5 megapixels. The camera 120 images allow easy resolution of the license plate or other vehicle identifying features to confirm the correct vehicle 116. The camera 120 could even resolve student or faculty school stickers if they are mounted on the front windshield. In one embodiment, the housing 118 comprises a plurality of LEDs and positioned at near to the camera 120. In one embodiment, the LEDs are configured to provide light to capture images in the darkness.

In one embodiment, the chip reader 121 is positioned on a bottom of the housing 118 of the parking meter 100. The chip reader 121 is configured to read and accept any debit or credit card with the RIFD chip embedded in it. The user could pay the amount for the use of the parking lot 102 (shown in FIG. 4A) by using the debit or credit card via the chip reader 121, the display 123 and the switches 129.

In one embodiment, the displays (122 and 123) have a wide temperature range and dot matrix. In one embodiment, the displays (122 and 123) could be liquid crystal displays. The displays (122 and 123) are configured to display almost any text or image, large or small, with extreme clarity. In one embodiment, the displays (122 and 123) are easily controlled with the onboard computer. In one embodiment, the display 123 communicates with the user through questions that may appear on the display 123 and the user could be accessed the parking meter 100 for the parking lot 102 via the application or with the switches 129.

In one embodiment, the plurality of backlight panels or indicators (124, 126 and 128) are positioned below the display 122 of the housing 118 of the parking meter 100. In one embodiment, the plurality of backlight panels or indicators (124, 126 and 128) are configured to indicate the status of the parking lot 102. In one embodiment, each backlight panel or indicator could be illuminated in a different color and inscribed with the appropriate word. The backlight panels (124, 126 and 128) are routed and then backfilled with black paint so the word stands out when the unit is backlighted. In one embodiment, the backlight panels (124, 126 and 128) could be illuminated in multiple colors, but not limited to, red, green and yellow colors. In one embodiment, the red backlight panel 124 could be inscribed with the word "reserved", the green backlight panel 126 could be inscribed with the word "available" and the yellow backlight panel 128 could be inscribed with the word "violation". If the parking lot 102 is reserved by the user, the red backlight panel 124 is illuminated. If the parking lot 102 is empty and unreserved then the green backlight panel 126 is illuminated. If the vehicle 116 (shown in FIG. 5) has left the parking lot 102 without paying, then yellow backlight panel 128 is illuminated.

In one embodiment, the plurality of switches 129 is positioned on both sides of the display 123. In one embodiment, the plurality of switches 129 could be sealed and printed with the operating functions. In one embodiment, the plurality of switches 129 could be at least six switches. In one embodiment, the user could operate the plurality of switches 129 for different functions via the display 123, when the network signals are not available.

In one embodiment, the parking meter 100 further comprises a near field communication (NFC) 132. In one embodiment, the NFC 132 could allow the user to communicate with the parking meter 100 to pay for the usage of the parking lot 102 via the smartphone 108 or tablet. This input is then used to initiate and engage in the 'tap n go' pay capability of smartphones. In one embodiment, the parking meter 100 further comprises an ultrasonic sensor. In one embodiment, the ultrasonic sensor is configured to sense the movement of the vehicle 116 (shown in FIG. 5) near to the parking lot 102. Based on the output of the ultrasonic sensor, the controller or controlling computer could initiate the operation of the camera 120 to capture the vehicle's license number for authorization.

In one embodiment, the multiple electronic devices are mounted on a printed circuit board (PCB). The PCBs for the multiple devices are fabricated to the final assembler's requirements in a world-class contract electronic assembler facility. The standard thickness, double-sided FR4 circuit board material is populated with surface mounted components where possible. Any through-hole devices are inserted after the surface mounted assembly, soldering, and cleaning. Both circuit boards are designed to have all the components oriented so they can be mounted with the LED illuminators and displays projecting out of the lenses mounted in the housings. After assembly, the PCBs are protected with a moisture adsorption preventive conformal coating.

Figure 6B:
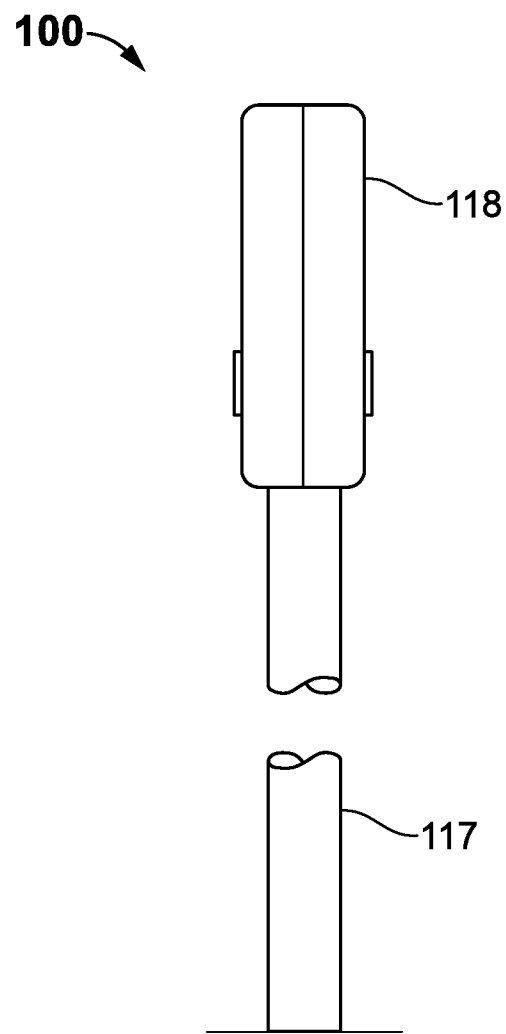
FIG. 6B shows a side view of the parking meter in an embodiment of the present invention.

Referring to FIG. 6B, the side view of the parking meter 100 is illustrated. In one embodiment, the multiple electronic components are fastened to the housing 118 via an adhesive or a fastener. In one embodiment, the fiberglass reinforced plastic molded housing 118 could resist weather, sunlight, light impacts, and malicious damage without any interruption of operation of the parking meter 100. In one embodiment, the housing 118 is held together via, but not limited to, a casket seal with an O-ring and tamper proof fasteners 134 (shown in FIG. 6A). In one embodiment, the housing 118 of the parking meter 100 could be attached to the supporter 117 via fasteners. In another embodiment, the housing 118 of the parking meter 100 could be welded to the supporter 117. In one embodiment, the supporter 117 could be a galvanize coated steel pipe. In one embodiment, the supporter 117 is a 4-inch diameter pipe and could be inserted into a drilled hole in the asphalt or concrete parking lot or deck 102. The supporter 117 is strong enough to withstand most inadvertent low speed impacts without degradation.

In another embodiment, the parking meter 100 could be augmented with a pop-up arm that is located in a slot at the rear of the parking lot 102. This arm swings up out of the slot when the user reserves the parking lot 102. The arm and small sign will rotate downward, allowing access to the parking lot 102 when the user notifies via the system. The application will allow all this communication and the parking meter 100 will authorize when the correct vehicle 116 parked in the parking lot 102.

In other embodiment, the parking meter 100 could utilize a post with a motorized arm at the end of the parking lot 102 that swings down when the user arrived at the parking lot 102. In an example, it is similar to a railroad crossing arm and retracts up when the user is approaching and notifies the system. This post and motorized arm will be located at the driver's side of the parking lot 102 and cabled to the parking meter 100 for power and operating instructions.

Figure 6C:
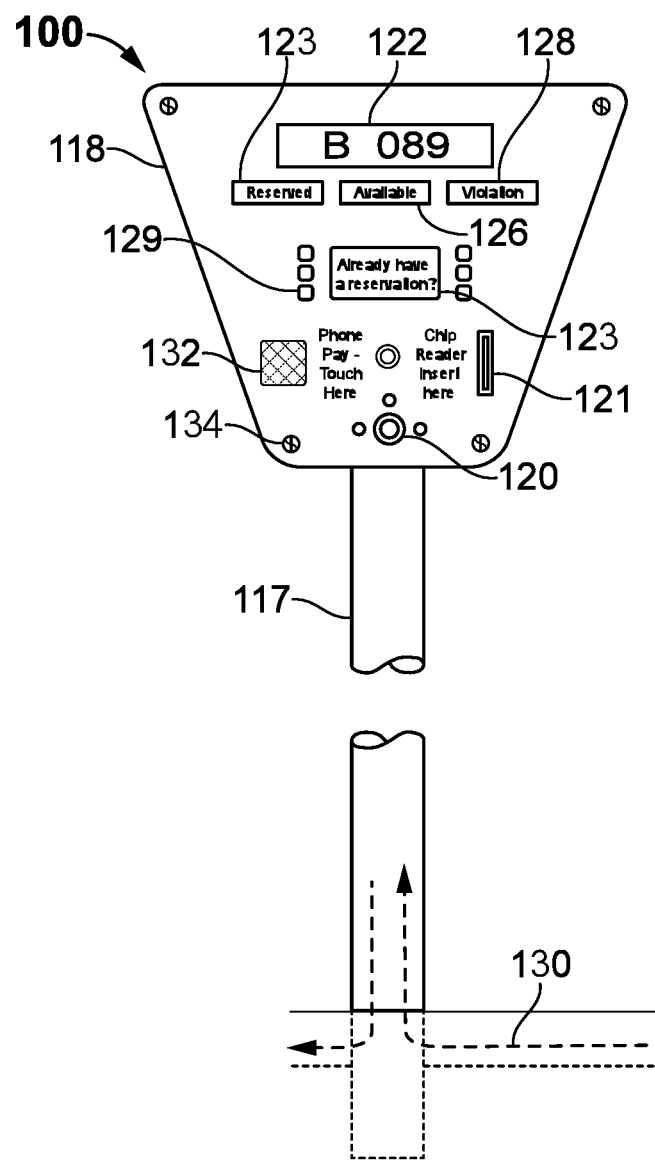
FIG. 6C shows a front view of the parking meter provided with a power line in an embodiment of the present invention.

Referring to FIG. 6C, the front view of the parking meter 100 provided with a power line 130 is illustrated. In one embodiment, the parking meter 100 could be removably attached to the supporter 117. In one embodiment, the parking meter 100 could be replaced immediately and programmed on the spot to maximize revenues while minimizing parking delays. In one embodiment, the payment mode could be executed from the smartphone via the application. In some embodiments, the user could be used any one of the payment modes, but not limited to, the NFC 132, or the chip reader 121 on credit and debit cards. In one embodiment, the parking meter 100 could be provided with the power line 130 for charging the onboard battery of the parking meter 100. In one embodiment, the power line 130 could be 120 VAC power cord. In one embodiment, the power line 130 could be fed into the supporter 117 and coated or sealed via, but not limited to, a polyurethane material, self-leveling, and water-resistant sealant.

In operation, at one step, the user could download and installed the application in the smartphone 108 (shown in FIG. 1B). At another step, the user could search the nearby empty parking lot 102 (shown in FIG. 1A) according to the user's destination and distance from the user to parking lot 102 (shown in FIG. 1A). At another step, the user could engage or reserve the parking lot 102 (shown in FIG. 1A) via the parking meter 100. The application finds the closest parking lot 102 (shown in FIG. 1A) and allocates it as reserved, tagging the space with the pre-loaded vehicle ID feature. The parking lot server reports the user's location. In one embodiment, the user's location could be identified via, but not limited to, a vehicle navigation system and a mobile mapping function. At another step, after successful reservation of the parking lot 102 (shown in FIG. 1A), the application could direct the user to the reserved parking lot 102 via the navigation system of the vehicle 116 (shown in FIG. 1A) or the smartphone 108 (shown in FIG. 1B). At another step, the user could be requested via the application for payment. The application could allow the user to pay the money for the parking lot 102 (shown in FIG. 1A) via, but not limited to, a credit card, a debit card, and a PayPal. Once the transaction is complete or prepaid, the user could leave the car parked in the parking lot 102 for the specified amount of time. After, the application could display or register the parking lot 102 (shown in FIG. 1A) as an empty or unoccupied and allowing the sequence to repeat. In one embodiment, the application could save the user's time and avoid searching physically for the parking lots 102 (shown in FIG. 1A). The application provides a safe way to reserve the parking lot. If the vehicle 116 (shown in FIG. 1A) is parked in a reserved parking lot 102 (shown in FIG. 1A), or has left without paying, the violation backlight light 128 (shown in FIG. 4B) will be on and the lot server will warn the operator so the vehicle 116 (shown in FIG. 1A) could be towed.

The product works well in the application, is easy to maintain, and any routine maintenance could be performed. The parking lot 102 maintenance could be conducted normally with ice or snow removal and litter vacuuming easily performed outside the concrete parking block 106 rows. The application provides a convenient pay method, allow the user to quickly and efficiently park and engage in the activity they planned, dramatically reducing congestion, irritation, and frustration. The user could use the application to find a parking lot 102 and reserve the parking lot 102. The user also could get the directions to the parking lot 102, and pay from their smartphone or other electronic devices. The parking meter 100 could be supplied in almost any vibrant color, so a distinctive color may be chosen to enhance the product recognition factor, which could dramatically improve the market adoption of the product.

The parking meter 100 is designed to be aesthetic and effective in the application. The relative ease of manufacture and the moderately inexpensive components provide good marketability for the manufacturer. The user benefits from dramatically improved parking with much less frustration, which should provide considerable market interest in the product.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

The invention claimed is:

1. A parking system comprising:
   a parking space in a given parking lot;
   a user device having a software application that identifies the location of the user device to reserve and assisting in parking a vehicle in the parking lot;

a parking meter adjacent said parking space and in communication with the user device to authorize a user of the user device to park the vehicle in the parking space;

a server in communication with said parking meter and said user device to establish communication therebetween;

a barrier assembly to restrict access to the parking space, said barrier assembly comprising a speed bump positioned at an entrance to said parking space and positioned perpendicular to the path of said vehicle when entering said parking space, said speed bump having a slot on an upper surface, and a sign pivotal into and out of said slot.

2. The parking system according to claim 1 wherein said barrier system further comprises a lifting mechanism in wireless communication with said parking meter for pivoting said sign into and out of said slot upon receipt of a predetermined command from said parking meter.

3. The parking system according to claim 1 wherein said user device is in wireless communication with said parking meter.

4. The parking system according to claim 1 further comprising a global positioning system in communication with said parking meter and said user device.

5. The parking system according to claim 1 wherein said user device is either of a mobile phone, a tablet, a personal data assistant, a laptop or a computer.

6. The parking system according to claim 1 wherein said parking meter includes a housing having a chip reader for reading a payment card, a display for depicting vehicle information to a user, a plurality indicators for indicating a current status of the parking space and a plurality of switches to allow the user to perform various operations.

7. The parking system according to claim 6 wherein said housing includes a first display and second display.

8. The parking system according to claim 7 wherein the first display is configured to display a vehicle number.

9. The parking system according to claim 8 wherein the second display is configured to display images and text to convey information relating to a reservation to the user.

10. The parking system according to claim 9 further comprising a plurality of backlit status indicators for indicating reserved, available or a violation.

11. The parking system according to claim 7 wherein the parking meter includes an ultrasonic sensor to detect movement of the vehicle.

12. The parking system according to claim 1 wherein said parking meter includes a controlling computer.

13. The parking system according to claim 11 wherein said ultrasonic sensor is in communication with said camera for capturing an image of a vehicle upon detecting movement of said vehicle.

14. The parking system according to claim 7 wherein said housing further includes a plurality of LEDs near said camera for capturing images in darkness.

15. The parking system according to claim 6 wherein the housing further includes a camera configured to capture the image of a vehicle to verifying that the vehicle is authorized to park in said parking space.

16. A parking system comprising:

a parking space in a given parking lot, said parking space defined by a pair of spaced, parallel identifying stripes;

a user device having a software application that identifies the location of the user device to reserve and assisting in parking a vehicle in the parking lot;

a parking meter adjacent said parking space and in communication with the user device to authorize a user of the user device to park the vehicle in the parking space;

a server in communication with said parking meter and said user device;

a barrier assembly to restrict access to the parking space, said barrier assembly comprising an elongated speed bump positioned at an entrance to said parking space and perpendicular to the identifying stripes, said speed bump having a slot on an upper surface, and a sign pivotal into and out of said slot.

* * * * *